United States Patent
Hwang

(10) Patent No.: US 6,588,906 B2
(45) Date of Patent: Jul. 8, 2003

(54) SINGLE-PANEL COLOR IMAGE DISPLAY APPARATUS AND METHOD THEREOF

(75) Inventor: Ju-seong Hwang, Chungcheongnam-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 2 days.

(21) Appl. No.: 10/024,342

(22) Filed: Dec. 21, 2001

(65) Prior Publication Data

US 2003/0025881 A1 Feb. 6, 2003

(30) Foreign Application Priority Data

Jul. 26, 2001 (KR) .......................... 2001-45221

(51) Int. Cl.$^7$ .............................................. G03B 21/14
(52) U.S. Cl. ............................. 353/31; 349/5; 348/742
(58) Field of Search ............................. 353/31, 34, 37, 353/84; 349/5, 7, 8; 348/742, 760; 359/634

(56) References Cited

U.S. PATENT DOCUMENTS

| | | | |
|---|---|---|---|
| 5,159,485 A | | 10/1992 | Nelson |
| 5,633,737 A | * | 5/1997 | Tanaka et al. .................. 349/95 |
| 5,633,755 A | | 5/1997 | Manabe et al. |
| 5,757,341 A | * | 5/1998 | Clarke et al. ................... 345/32 |
| 5,822,021 A | * | 10/1998 | Johnson et al. .............. 348/742 |
| 5,897,190 A | * | 4/1999 | Takahashi ..................... 353/31 |
| 6,183,091 B1 | * | 2/2001 | Johnson et al. ................ 353/20 |
| 6,330,112 B1 | * | 12/2001 | Kaise et al. .................. 359/621 |

* cited by examiner

Primary Examiner—William Dowling
(74) Attorney, Agent, or Firm—Staas & Halsey LLP

(57) ABSTRACT

A single-panel color image display apparatus includes a plurality of switchable color filters selectively transmitting and/or reflecting a plurality of color light beams. In the single panel color image display apparatus, the plurality of color light beams are radiated in turn at the same pixel of a display device so that true color can be realized in a unit pixel during a period of a single video frame. The single-panel color image display apparatus has physically the same resolution as a conventional projection-type single-panel image display apparatus using a color wheel and has substantially the same light efficiency and resolution as a conventional three-panel color image display apparatus using three display devices.

40 Claims, 7 Drawing Sheets

SINGLE-PANEL COLOR IMAGE DISPLAY APPARATUS AND METHOD THEREOF

CROSS-REFERENCE TO RELATED APPLICATIONS

This application claims the benefit of Korean Application No. 2001-45221, filed Jul. 26, 2001, in the Korean Industrial Property Office, the disclosure of which is incorporated herein by reference.

BACKGROUND OF THE INVENTION

1. Field of the Invention

The present invention relates to a color image display apparatus, and more particularly, to a single-panel color image display apparatus using a single display device to display an image according to an electrical video signal and which achieves the same optical efficiency and resolution as a three-panel color image display apparatus using three display devices.

2. Description of the Related Art

FIG. 1 is a diagram showing an example of a conventional single-panel color image display apparatus 200, FIG. 2 is a diagram showing a light path in a micro lens array and a liquid crystal display device of the single-panel color image display apparatus 200 of FIG. 1. Referring to FIGS. 1 and 2, the conventional single-panel color image display apparatus includes a light unit 202, three dichroic mirrors 4R, 4G, and 4B which are obliquely provided, a micro lens array 10, and a liquid crystal display device 20.

The light unit 202 includes a white light source, i.e., a lamp 1, a spherical mirror 2 installed to surround one side of the lamp 1, and a condenser lens 3 condensing and converting diverging light directly incident from the lamp 1 and diverging light incident after being reflected from the spherical mirror 2 into parallel light.

White light emitted from the light unit 202 is divided into red light R, green light G, and blue light B by the three dichroic mirrors 4R, 4G, and 4B. The dichroic mirror 4R reflects red light R of the white light incident from the light unit and transmits light of the other colors, that is, green light G and blue light B. The dichroic mirror 4G reflects green light G of the color light transmitted by the dichroic mirror 4R and transmits light of the last color, that is, blue light B. The dichroic mirror 4B reflects the blue light B.

Each of the three dichroic mirrors 4R, 4G and 4B is disposed at an angle θ with respect to the dichroic mirror(s) adjacent to it, thus having the shape of the ribs of a fan. In other words, the dichroic mirror 4R is askew at an angle of −θ with respect to the dichroic mirror 4G, and the dichroic mirror 4B is askew at an angle of +θ with respect to the dichroic mirror 4G. Here, "+" indicates the counterclockwise direction, and "−" indicates the clockwise direction.

Accordingly, a chief ray of red light R is incident on the micro lens array 10 at an angle of −θ with respect to a chief ray of green light G, and a chief ray of blue light B is incident on the micro lens array 10 at an angle of +θ with respect to a chief ray of green light G.

The micro lens array 10 is the horizontal arrangement of a plurality of cylindrical lenses which form a unit micro lens 10a. The micro lens array 10 condenses red light R, green light G, and blue light B, which are incident on the micro lens array 10 at different angles, on signal electrodes 21R, 21G, and 21B, respectively, of the liquid crystal display device 20 in a striped pattern.

The liquid crystal display device 20 has a structure in which a liquid crystal layer 23 is sandwiched between two transparent glass substrates 24 and 25. Transparent conductive films 22 and signal electrodes 21R, 21G, and 21B are formed on both sides of the liquid crystal layer 23 in a matrix pattern.

In a conventional single-panel color image display apparatus having the above structure, R, G and B stripes obtained by dividing white light into three primary color rays using the three dichroic mirrors 4R, 4G, and 4B and condensing the rays on signal electrodes of the liquid crystal display device 20 are arranged at regular intervals in a horizontal direction due to differences among incident angles of the chief rays of red light R, green light G, and blue light B. These R, G, and B stripes correspond to the R, G, and B video signal electrodes 21R, 21G, and 21B. The R, G, and B signal electrodes 21R, 21G, and 21B are subpixels and constitute a single image pixel.

Three subpixels corresponding to red, green, and blue correspond to a unit micro lens 10a. When the three subpixels form an image on a screen 7 through a field lens 5 and a projection lens 6, a set of the three subpixels appears as a single image pixel. Accordingly, a viewer can see a color image composed of image pixels.

However, since three subpixels constitute a single image pixel in such a conventional single-panel color image display apparatus, the resolution of a liquid crystal display device is reduced to ⅓. Accordingly, in order to realize the same resolution as projection type single-panel image display apparatuses using a color wheel, which are disclosed in U.S. Pat. Nos. 5,633,755 and 5,159,485, the physical resolution of the liquid crystal display device 20 should be increased by three times.

When the physical resolution of the liquid crystal display device 20 is increased by three times, an aperture ratio is deteriorated, thus decreasing light efficiency. In addition, yield decreases, thus increasing manufacturing costs. Moreover, when the liquid crystal display device 20 is manufactured to have three times higher resolution, the size of the liquid crystal display device 20 may increase. As the liquid crystal display device 20 becomes larger, the condenser lens 3, the field lens 5, or the projection lens 6 should also be larger, which increases manufacturing costs.

SUMMARY OF THE INVENTION

To solve the above problems, it is an aspect of the present invention to provide a single-panel color image display apparatus having an improved structure of a color light beam splitting unit. The color light beam splitting unit of the present invention splits a white light beam emitted from a light unit into a plurality of color light beams, thus having physically the same resolution as a conventional projection type single-panel image display apparatus using a color wheel and having substantially the same light efficiency and resolution as a conventional three-panel color image display apparatus using three display devices.

To achieve the above aspect of the invention, the present invention comprises a single-panel color image display apparatus including a light unit, a color light beam splitting unit, an image generator, and a projection lens unit. The light unit emits white light. The color light beam splitting unit comprises a plurality of switchable color filters which selectively transmit and/or reflect a plurality of color light beams. The color light beam splitting unit splits the white light incident from the light unit into a plurality of color light beams and reflects the plurality of color light beams. The image generator generates a plurality of color images using the plurality of color light beams from the color light beam splitting unit. The projection lens unit projects the plurality of color images generated by the image generator onto a screen.

The color light beam splitting unit includes as many switchable color filters as color light beams generated by splitting. That is, in the color light beam splitting unit of the present invention, the number of switchable color filters corresponds to the number of color light beams generated by splitting.

The switchable color filters alternately select and reflect the plurality of color light beams in response to electrical signals during each period of a subframe, which is one of as many subframes as color light beams generated by splitting. That is, the number of subframes corresponds to the number of color light beams generated by splitting.

In other words, each of the switchable color filters includes as many electronically switchable selective reflection/transmitting layers as color light beams generated by splitting. That is, the number of electronically switchable selective reflection/transmitting layers included in each of the switchable color filters corresponds to the number of color light beams generated by splitting.

Each of the selective reflection/transmitting layers includes a liquid crystal layer having at least one side facing a transparent substrate, and a transparent electrode. The liquid crystal layer comprises liquid crystal drops in high-molecular chains arranged at predetermined intervals and a liquid crystal solution filling gaps among the liquid crystal drops. The liquid crystal layer selectively reflects a predetermined color light beam according to the difference between the refractive index of the liquid crystal drops and the refractive index of the liquid crystal solution which is adjusted by an electrical signal. The transparent electrode is formed on the substrate to allow an electric field to be applied to the liquid crystal layer.

In the present invention, the plurality of switchable color filters are disposed at a predetermined angle to one another.

The light unit includes a light source, a lighting lens, and a polarization converter. The light source emits white light. The lighting lens converts light emitted from the light source into parallel light. The polarization converter converts light emitted from the light source into a single linearly polarized light beam.

In the present invention, the light lens may include a fly eye lens array converting light incident from the light source into uniform beams.

The polarization converter includes a polarizing splitter, a reflector, and a half-wave plate. The polarization converter selectively transmits and reflects incident light according to the linear polarization of the incident light. The reflector reflects light reflected from the polarizing splitter in a direction parallel to light transmitted by the polarizing splitter. The half-wave plate is disposed on the path of light transmitted by the polarizing splitter or light reflected from the reflector.

In one embodiment of the present invention, the light source comprises a lamp-type light source having a parabolic reflector.

The image generator includes a first micro lens array condensing color light beams incident from the color light beam splitting unit, and a display device generating a color image from incident color light beams having passed through the first micro lens array.

In the present invention, the display device comprises a transmissive liquid crystal display device.

Alternatively, the display device comprises a reflective liquid crystal display device and may further include a polarizing splitter, disposed between the color light beam splitting unit and the first micro lens array, transmitting or reflecting incident light according to polarization.

In one embodiment of the present invention, the single-panel color image display apparatus further includes a micro prism array or a second micro lens array disposed between the display device and the first micro lens array and arranged so that light reflected from the display device can pass through a micro lens of the same first micro lens array as when the reflected light was incident.

Moreover, the present invention comprises a method of a single-panel color image display apparatus. The method of the present invention comprises emitting, by a light unit, white light. The method further comprises splitting the white light incident from the light unit by a color light beam splitting unit into a plurality of color light beams and selectively reflecting the plurality of color light beams by a plurality of switchable color filters of the color light beam splitting unit. In addition, the method comprises generating by an image generator a plurality of color images using the plurality of color light beams from the color light beam splitting unit. Also, the method comprises projecting onto a screen by a projection lens unit the plurality of color images generated by the image generator.

Further, the present invention comprises a single-panel color image display apparatus including means for emitting a white light, a color light beam splitting unit comprising a plurality of switchable color filters which selectively transmit and/or reflect a plurality of color light beams, the color light beam splitting unit splitting the white light incident from the light unit into a plurality of color light beams and reflecting the plurality of color light beams, means for generating a plurality of color images using the plurality of color light beams from the color light beam splitting unit and projecting the plurality of color images.

Additional objects and advantages of the invention will be set forth in part in the description which follows and, in part, will be obvious from the description, or may be learned by practice of the invention.

BRIEF DESCRIPTION OF THE DRAWINGS

These and other aspects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
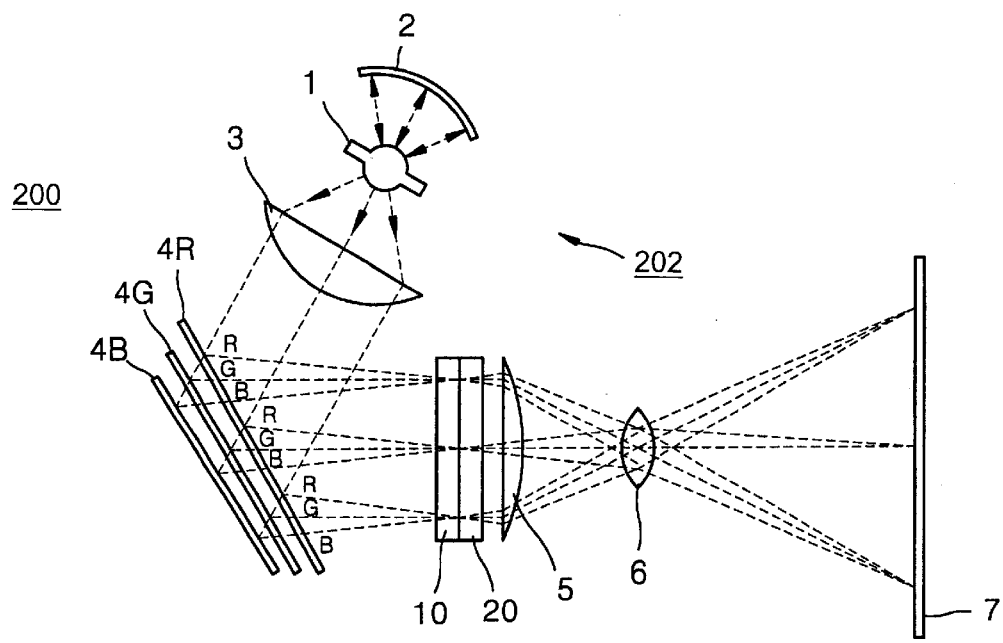
FIG. 1 is a diagram of an example of a conventional single-panel color image display apparatus.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 3:
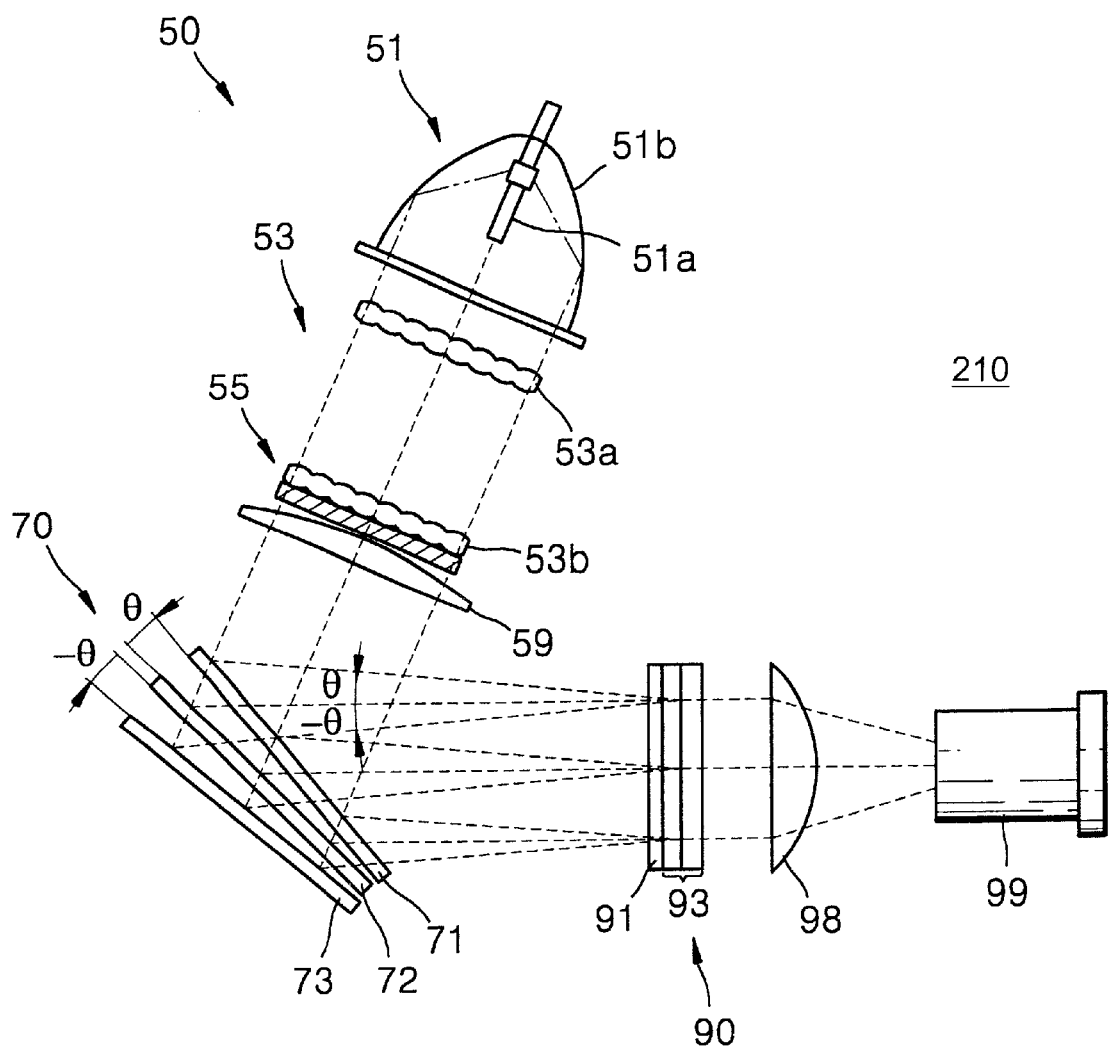
FIG. 3 is a schematic diagram of a single-panel color image display apparatus according to a first embodiment of the present invention.

FIG. 3 is a schematic diagram of a single-panel color image display apparatus 210 according to a first embodiment of the present invention. Referring to FIG. 3, the single-panel color image display apparatus 210 includes a light unit 50 emitting a white light beam, a color light beam splitting unit 70 reflecting and splitting a white light beam incident from the light unit 50 into a plurality of color light beams, an image generator 90 generating color images using a plurality of color light beams from the color light beam splitting unit 70, and a projection lens unit 99 projecting a plurality of color images generated by the image generator 90 onto a screen (not shown).

The light unit 50 includes a light source 51 emitting white light, a lighting lens 53 converting white light emitted from the light source 51 into parallel light, and a polarization converter 55 converting light emitted from the light source 51 into single linearly polarized light.

In the present invention, a lamp-type light source emitting white light is included as the light source 51. The lamp-type light source 51 includes a lamp 51a emitting white light and a reflecting mirror 51b surrounding one side of the lamp 51a. The reflecting mirror 51b is a parabolic reflector which has a focal point at the position of the lamp 51a and makes light emitted from the lamp 51a and reflected from the reflecting mirror 51b parallel.

The lighting lens 53 includes an array of fly eye lenses 53a and 53b which converts light incident from the light source 51 into uniform beams. The array of fly eye lenses 53a and 53b converts an incident beam into a uniform square beam. In the present invention, the light unit 50 includes a scrambler as a light mixing unit making incident light uniform through diffused reflection, instead of including the lighting lens 53.

Figure 4:
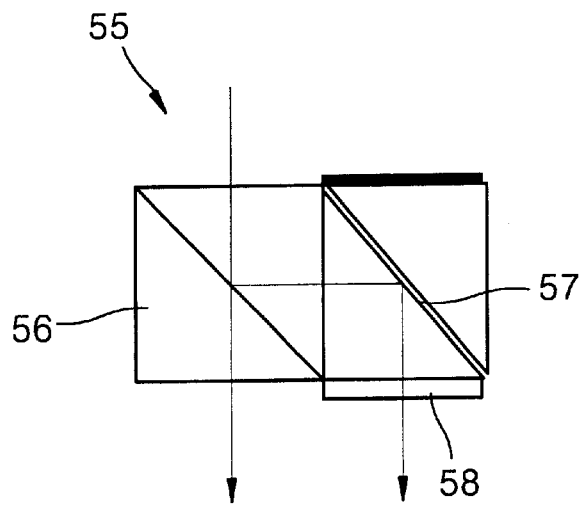
FIG. 4 is a schematic diagram of an embodiment of a polarization converter of FIG. 3.

As shown in FIG. 4, the polarization converter 55 may include a polarizing beam splitter 56, a reflector 57, and an array of half-wave plates 58. The polarizing beam splitter 56 selectively transmits or reflects incident light according to the linear polarization of the incident light. The reflector 57 reflects light reflected from the polarizing beam splitter 56 in a direction parallel to light transmitted by the polarizing beam splitter 56. The array of half-wave plates 58 is disposed on the path of light transmitted by the polarizing beam splitter 56 or light reflected from the reflector 57. Light emitted from the light source 51 is converted into single linearly polarized light by the polarization converter 55.

Meanwhile, the light unit 50 further includes a condenser lens 59 converting light emitted from the light source 51 into parallel light. The light unit 50 having such a structure emits uniform parallel beams of single, linearly polarized light.

The color light beam splitting unit 70 includes a plurality of switchable color filters 71, 72, and 73 which selectively reflects and/or transmits a plurality of color light beams, for example, a red (R) light beam, a green (G) light beam, and a blue (B) light beam. The switchable color filters 71, 72, and 73 are disposed at a predetermined angle with respect to one another, forming a fan shape. The color light beam splitting unit 70 comprises as many switchable color filters as the number of colors to be split. That is, the number of switchable color filters included in the color light beam splitting unit 70 corresponds to the number of colors to be split. For example, when an incident light beam is split into three primary color light beams, i.e., R, G, and B light beams, the color light beam splitting unit 70 includes the three switchable color filters 71, 72, and 73, as shown in FIG. 3.

Figure 5:
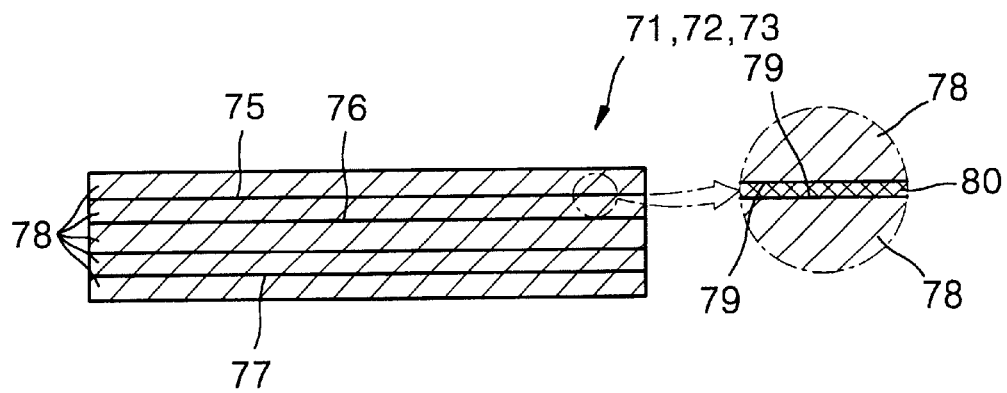
FIG. 5 is a diagram of a switchable color filter of FIG. 3.

The switchable color filters 71, 72, and 73 alternately select and reflect a plurality of color light beams according to electrical signals during each period corresponding to a subframe, which is one of as many subframes as color light beams generated by splitting. That is, the number of subframes corresponds to the number of color light beams generated by splitting. In other words, each of the switchable color filters 71, 72, and 73 includes as many electrically switchable selective reflection/transmitting layers (electrically switchable Bragg gratings (ESBGs)) 75, 76, and 77 as color light beams generated by splitting, as shown in FIG. 5. That is, the number of electrically switchable selective reflection/transmitting layers (electrically switchable Bragg gratings (ESBGs)) 75, 76, and 77 included in each of the switchable color filters 71, 72, and 73 corresponds to the number of color light beams generated by splitting.

For example, when the color light beam splitting unit 70 is provided for splitting a white light beam incident from the light unit 50 into three primary color light beams, i.e., R, G, and B light beams, and the image generator 90 is provided for generating color images using the color light beams, each of the switchable color filters 71, 72, and 73 includes first through third selective reflection/transmitting layers 75, 76, and 77, as shown in FIG. 5.

Each of the first through third selective reflection/transmitting layers 75, 76, and 77 includes a liquid crystal layer 80 which is sandwiched between transparent substrates 78 to selectively reflect a predetermined color light beam according to an electrical signal and a transparent electrode 79 formed on the inside of each of the transparent substrates 78 to apply an electric field to the liquid crystal layer 80.

Figure 6A:
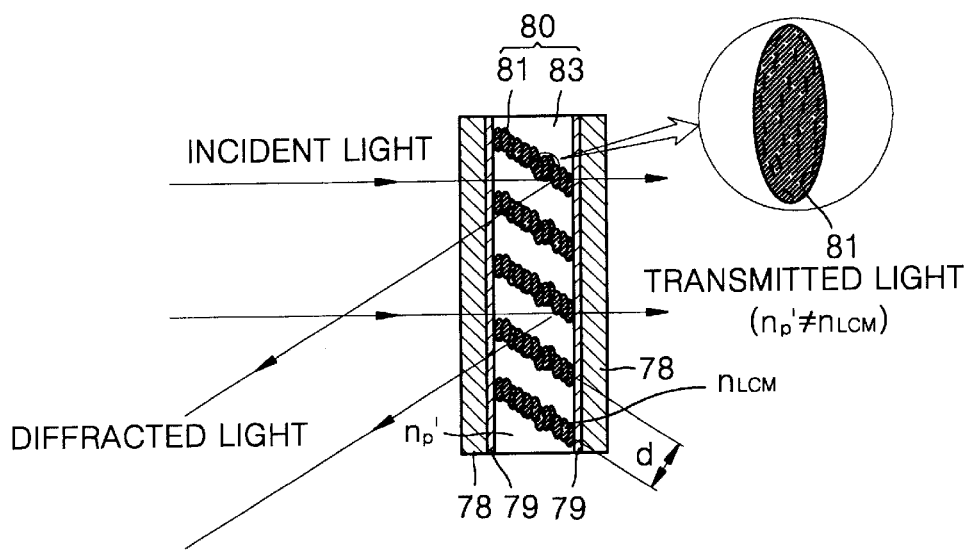
FIGS. 6A and 6B are diagrams of the structure of a liquid crystal layer of the switchable color filter of FIG. 5 and selective transmission and reflection of light by the switchable color filter.
Figure 6B:
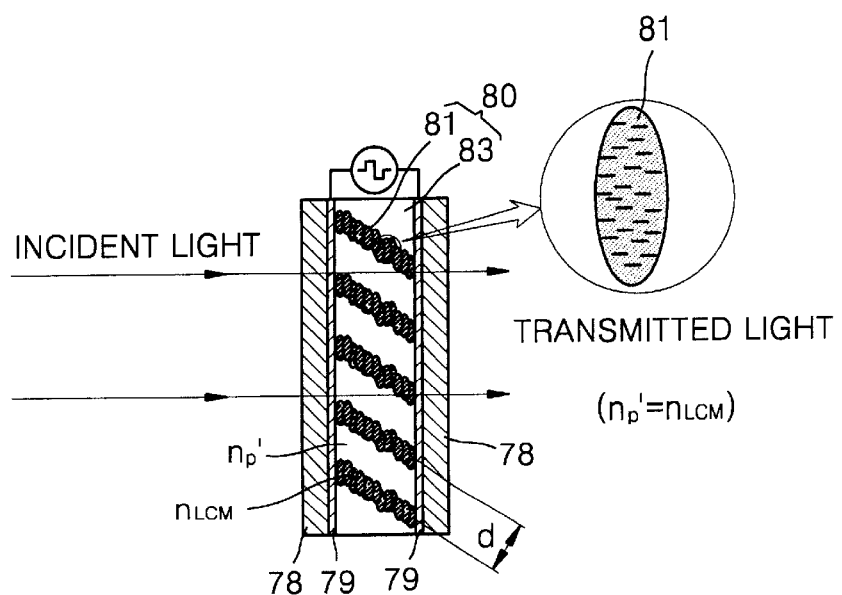

As shown in FIGS. 6A and 6B, the liquid crystal layer 80 comprises of liquid crystal drops 81 in high-molecular chains arranged at predetermined intervals and a liquid crystal solution 83 filling gaps among the liquid crystal drops 81.

The liquid crystal drops 81 are arranged at intervals of a predetermined distance "d". When the refractive index $n_{LCM}$ of the liquid crystal drops 81 is different than the refractive index $n_p'$ of the liquid crystal solution 83, the liquid crystal drops 81 arranged at intervals of a predetermined distance "d" as described above act as a diffraction grating to diffract incident light. Accordingly, the liquid crystal layer 80 can act as a color reflecting filter which reflects only light in a particular spectrum band in the spectrum of the white light beam according to a diffraction grating distance, i.e., the distance "d" between liquid crystal drops 81.

Selective reflection of a particular color light beam at the liquid crystal layer 80 is based on the following principle. As shown in FIG. 6A, when the refractive index $n_{LCM}$ of the liquid crystal drops 81 is different than the refractive index $n_p'$ of the liquid crystal solution 83 in a state in which a voltage is not applied to the liquid crystal layer 80, the liquid crystal layer 80 diffracts a particular color light beam but transmits the other color light beams. As shown in FIG. 6B, when liquid crystal molecules constituting the liquid crystal drops 81 are arranged in the direction of an electric field due to a predetermined voltage applied to the liquid crystal layer 80, so that the refractive index $n_{LCM}$ of the liquid crystal drops 81 is the same as the refractive index $n_p'$ of the liquid crystal solution 83, a diffraction grating which is formed due to the difference between the refractive index of the liquid crystal drops 81 and the refractive index of the liquid crystal solution 83 vanishes. Accordingly, the liquid crystal layer 80 transmits most incident light without diffraction.

For example, when it is assumed that, as shown in FIGS. 3 and 5, the color light beam splitting unit 70 comprises three switchable color filters 71, 72, and 73 to split an incident light beam into R, G, and B light beams, each of the switchable color filters 71, 72, and 73 includes first through third selective reflection/transmitting layers 75, 76, and 77 sequentially arranged from the side on which light is incident. Each of the first through third selective reflection/transmitting layers 75, 76, and 77 includes liquid crystal drops 81 which are arranged at certain intervals allowing the R, G, and B light beams to be selectively reflected and transmitted. Each of the switchable color filters 71, 72, and 73 reflects one of the R, G, and B light beams and transmits the other color light beams according to an input voltage signal.

In other words, when a voltage is not applied to the first selective reflection/transmitting layer 75 but is applied to the second and third selective reflection/transmitting layers 76 and 77, the first selective reflection/transmitting layer 75 diffracts and reflects an R light beam and transmits G and B light beams, and the second and third selective reflection/transmitting layers 76 and 77 transmit the G and B light beams transmitted by the first selective reflection/transmitting layer 75.

Moreover, when a voltage is not applied to the second selective reflection/transmitting layer 76 but is applied to the first and third selective reflection/transmitting layers 75 and 77, the first selective reflection/transmitting layer 75 transmits all R, G, and B light beams, the second selective reflection/transmitting layer 76 diffracts and reflects the G light beam among the R, G, and B light beams transmitted by the first selective reflection/transmitting layer 75 and transmits the other color light beams (R and B), and the third selective reflection/transmitting layer 77 transmits both of the incident R and B light beams.

In addition, when a voltage is not applied to the third selective reflection/transmitting layer 77 but is applied to the first and second selective reflection/transmitting layers 75 and 76, the first and second selective reflection/transmitting layers 75 and 76 transmits all R, G, and B light beams, and the third selective reflection/transmitting layer 77 diffracts and reflects the B light beam among the R, G, and B light beams incident through the first and second selective reflection/transmitting layers 75 and 76 and transmits the other color light beams (R and G).

Figure 7:
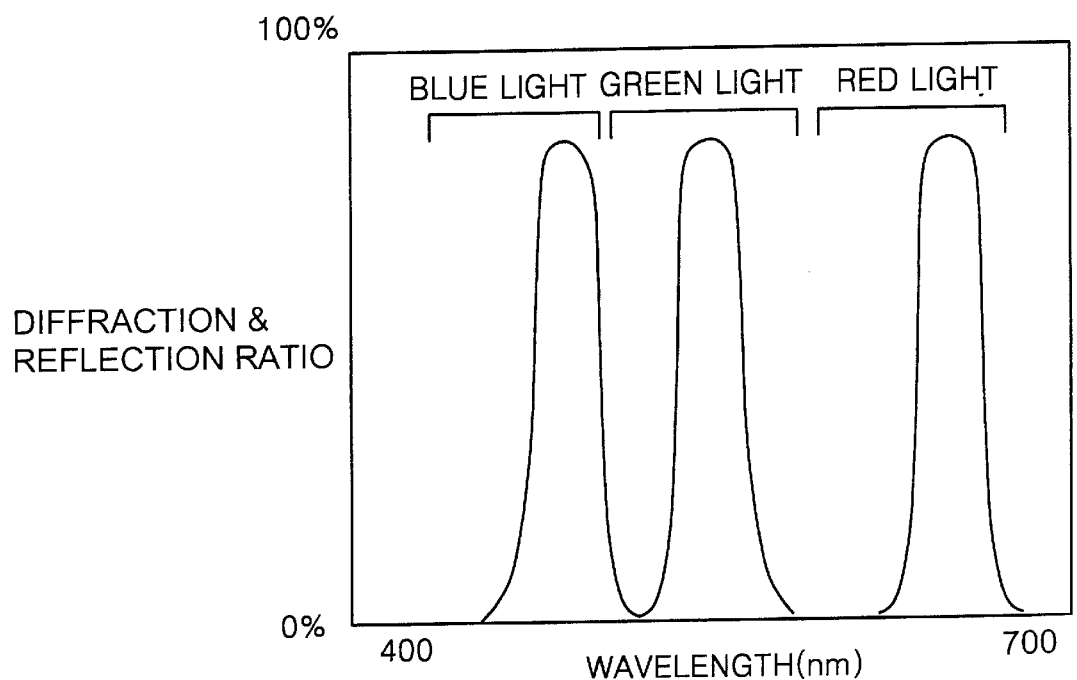
FIG. 7 is a graph of diffraction and reflection ratios for red light R, green light G, and blue light B versus wavelength in a switchable color filter according to the present invention.

In the present invention, light is scarcely lost at the liquid crystal layer 80 of each of the first through third selective reflection/transmitting layers 75, 76, and 77 which selectively diffract and reflect incident light beams. Therefore, the liquid crystal layers of the first through third selective reflection/transmitting layers 75, 76, and 77 have the almost same large diffraction and reflection ratios with respect to R, G, and B light beams for the same quantity of light, as shown in FIG. 7.

Figure 2:
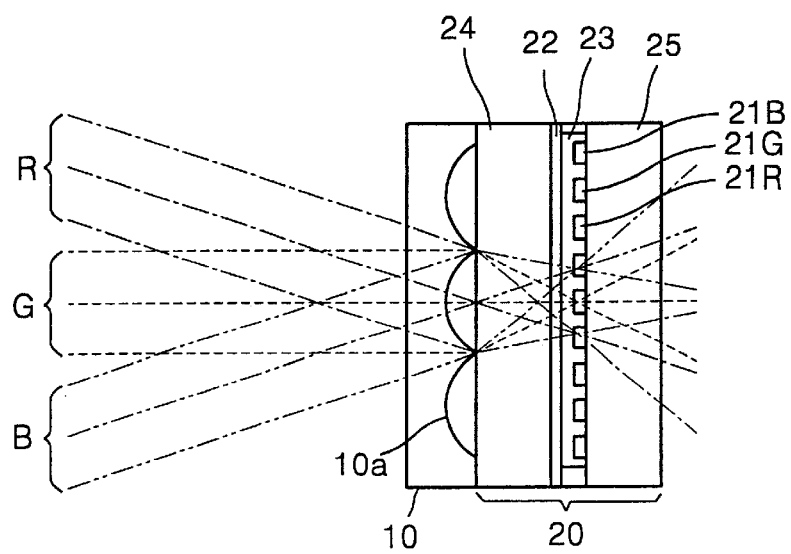
FIG. 2 is a diagram of a light path in a micro lens array and a liquid crystal display device of the single-panel color image display apparatus of FIG. 1.

Accordingly, the color light beam splitting unit 70 having the above-described structure selectively diffracts and reflects R, G, and B light beams using the three switchable color filters 71, 72, and 73 obliquely disposed at different angles. Hence, the color light splitting unit 70 radiates the R, G and B light beams at different portions of the image generator 90, and radiates in turn the R, G and B light beams at the same portion of the image generator 90 during the period of each of three subframes into which a single video frame is divided. Therefore, a single-panel color image display apparatus according to the present invention realizes three times higher physical resolution than a conventional single-panel color image display apparatus described above with reference to FIGS. 1 and 2.

That is, the single panel color image display apparatus according to the present invention realizes the same physical resolution as a conventional single-panel image display apparatus using a color wheel and a conventional three-panel color image display apparatus.

Figure 8:
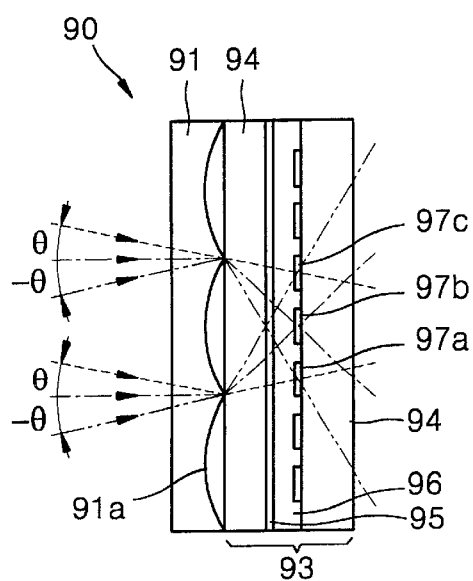
FIG. 8 is a diagram of the entire structure of an image generator of FIG. 3.

Referring to FIGS. 3 and 8, the image generator 90 includes a first micro lens array 91 condensing color light beams incident from the color light beam splitting unit 70, and a display device generating a color image using incident color light beams having passed through the first micro lens array 91.

The first micro lens array 91 comprises a horizontal arrangement of a plurality of cylindrical lenses which form a unit micro lens 91a. The first micro lens array 91 condenses color light beams, for example, R, G, and B light beams, which are incident at different angles, on the signal electrodes of the display device in a striped pattern.

In the first micro lens array 91, a unit micro lens 91a corresponds to three pixel columns of the display device. In other words, each micro lens 91a allows color light beams incident at different angles to be separately radiated onto three pixel columns, i.e., three signal electrodes 97a, 97b, and 97c.

In the first embodiment of the present invention, the display device is realized as a transmissive liquid crystal display device 93. The liquid crystal display device 93 has a structure in which a liquid crystal layer 96 is sandwiched between two transparent glass substrates 94. The surface adjacent to the liquid crystal layer 96 of the transparent glass substrate 94 upon which light is incident is coated with a transparent electrode 95. Signal electrodes 97a, 97b, and 97c are formed in a matrix pattern on the surface adjacent to the liquid crystal layer 96 of the transparent glass substrate 94 from which light is emitted. Three signal electrodes 97a, 97b, and 97c constitute one group for a unit micro lens 91a. The signal electrodes 97a, 97b, and 97c comprise transparent electrodes like the transparent electrode 95.

In the present invention, the signal electrodes 97a, 97b, and 97c through which a driving voltage is applied to the transmissive liquid crystal display device 93 may be in the form of a thin film transistor (TFT).

A field lens 98 is provided between the image generator 90 and the projection lens unit 99 to condense incident light from the image generator 90 and transmit the condensed light to the projection lens unit 99.

The projection lens unit 99 enlarges and projects a color image generated by the image generator 90 onto a screen (not shown).

Hereinafter, the operation of a single-panel color image display apparatus having the above structure according to the first embodiment of the present invention will be described on the condition that the color light beam splitting unit 70 splits a white light beam incident from the light unit 50 into three primary color light beams, i.e., R, G, and B light beams, and the corresponding image generator 90 generates a color image using the R, G, and B light beams.

White light emitted from the light source 51 is converged into a uniform square-shaped beam by a light mixing unit, i.e., an array of the fly eye lenses 53a and 53b. The uniform square-shaped beam is converted into a single linearly polarized light beam by the polarization converter 55. The linearly polarized square-shaped beam is collimated by the condenser lens 59 and is incident on the color light beam splitting unit 70. Light beam splitting unit 70 comprises a plurality of switchable color filters 71, 72 and 73 which are arranged in the form of a sector.

A white light beam incident on the color light beam splitting unit 70 is split into three primary color light beams, i.e., R, G, and B light beams. Each of the switchable color filters 71, 72, and 73 of the color light beam splitting unit 70 selectively reflects R, G, and B light beams during each ⅓ of the period of a video frame. Since each of the switchable color filters 71, 72, and 73 is disposed at an angle of θ with respect to its adjacent color filter(s), for example, when the switchable color filter 71 selectively reflects an R light beam, the switchable color filter 72 selectively reflects a G light beam, and the switchable color filter 73 selectively reflects a B light beam, the R light beam has a difference of −θ in an angle of reflection with respect to the G light beam, and the B light beam has a difference of +θ in an angle of reflection with respect to the G light beam. As described above, R, G, and B light beams are incident on the first micro lens array 91 at an angle of θ with respect to an adjacent light beam, so that the R, G, and B light beams are separated by the micro lens 91a and condensed in turn on different portions, i.e., different signal electrodes 97a, 97b, and 97c. When the focal length of the micro lens 91a is fm, the distance or the pixel pitch "p" between the chief rays of the R, G, and B light beams can be expressed by p=fm×tan θ.

As a result, among the three signal electrodes 97a, 97b, and 97c corresponding to the unit micro lens 91a, color light beams reflected by the switchable color filter 71 are condensed on the signal electrode 97a, color light beams reflected by the switchable color filter 72 are condensed on the signal electrode 97b, and color light beams reflected by the switchable color filter 73 are condensed on the signal electrode 97c, so the color light beams are condensed in a striped pattern.

As shown in Table 1, when electrical signals are applied to the switchable color filters 71, 72, and 73 so that the switchable color filters 71, 72, and 73 can selectively reflect three primary color light beams during the period of each of the three video subframes into which a single video frame is divided, and when color image signals corresponding to color light beams condensed on the signal electrodes 97a, 97b, and 97c, respectively, are applied to the corresponding signal electrodes 97a, 97b, and 97c, different color images are formed in turn at the same pixel of the liquid crystal display device 93 at intervals of ⅓ of a video frame. As a result, three color images are sequentially formed at the same pixel during the period of a single video frame.

TABLE 1

| Video display time | Switchable color filter | Signal electrode |
| --- | --- | --- |
| ⅓ of a video frame | 71: R 72: G 73: B | 97a: R 97b: G 97c: B |
| ⅓ of a video frame | 71: B 72: R 73: G | 97a: B 97b: R 97c: G |
| ⅓ of a video frame | 71: G 72: B 73: R | 97a: G 97b: B 97c: R |

In Table 1, 71 through 73 indicate the switchable color filters, 97a, 97b, and 97c indicate signal electrodes, and R, G and B indicate red, green, and blue light reflected from the switchable color filters 71, 72, and 73, respectively, and indicate red, green, and blue image signals applied to the signal electrodes 97a, 97b, and 97c, respectively.

As described above, according to a matrix method, while a pixel row is addressed through the transparent electrode 95 in the liquid crystal display device 93, color image signals corresponding to color light beams condensed on the signal electrodes 97a, 97b, and 97c are loaded on the signal electrodes 97a, 97b, and 97c, respectively, during the period of ⅓ of a video frame. A color image formed by applying color image video signals to the liquid crystal display device 93 is enlarged and projected on a screen by the projection lens unit 99.

A single-panel color image display apparatus according to the first embodiment of the present invention converts light emitted from the light source 51 into a single linearly polarized light beam, splits the single linearly polarized light beam into a plurality of color light beams, and uses the color light beams to form a color image, thus realizing the same light efficiency as a conventional three-panel color image display apparatus.

Figure 9:
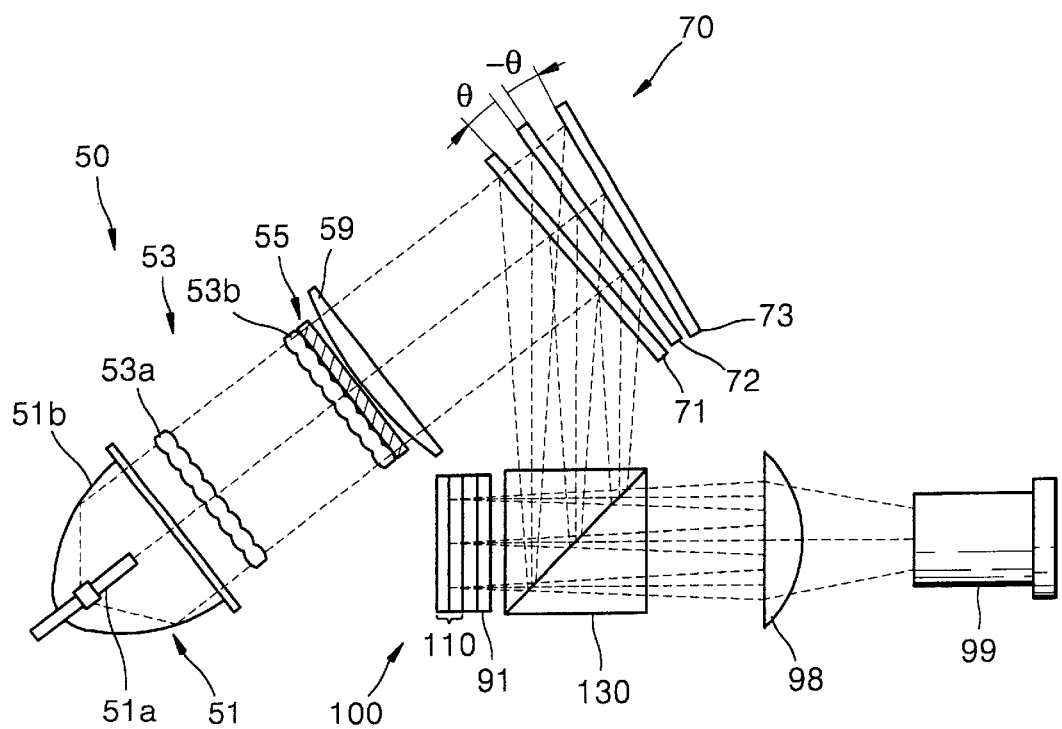
FIG. 9 is a schematic diagram of a single-panel color image display apparatus according to a second embodiment of the present invention.
Figure 10:
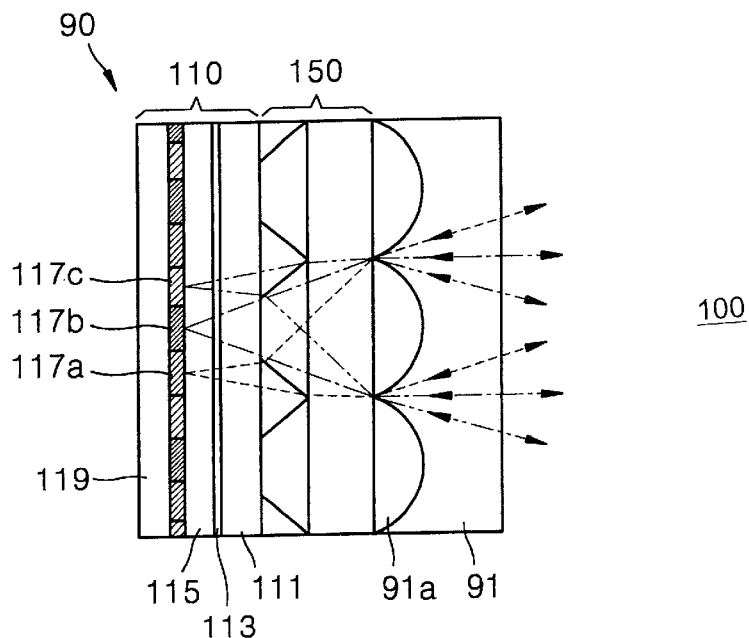
FIGS. 10 and 11 are schematic diagrams of embodiments of the image generator of FIG. 9 of the present invention.
Figure 11:
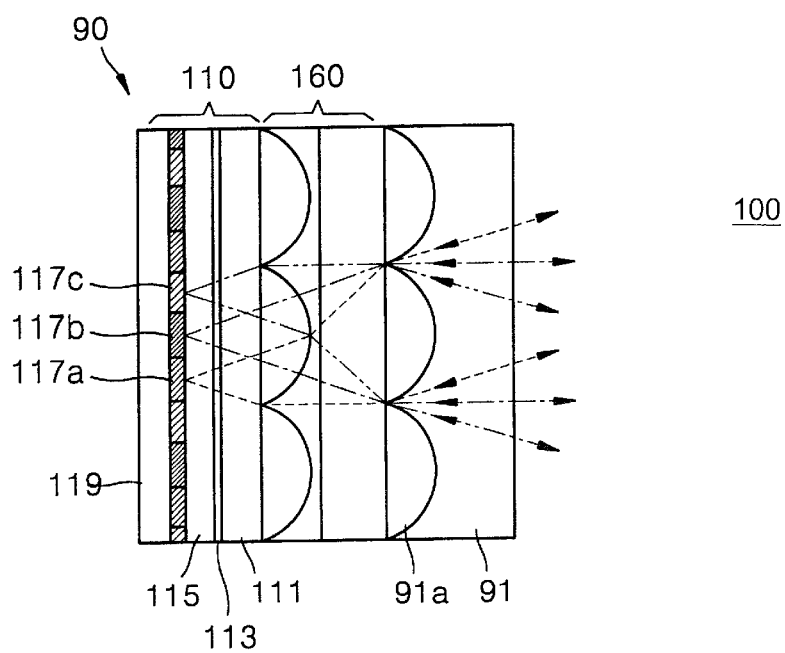

FIG. 9 is a schematic diagram of a single-panel color image display apparatus 220 according to a second embodiment of the present invention. FIG. 10 shows an embodiment of an image generator 100 of FIG. 9, and FIG. 11 shows another embodiment of the image generator 100 of FIG. 9. In FIGS. 3 and 9, like reference numerals denote the same member having the same structure and function.

A single-panel color image display apparatus 220 according to the second embodiment includes a reflective liquid crystal display device 110 provided as a display device and a polarizing splitter 130 further provided between a color light beam splitting unit 70 and a first micro lens array 91. The polarizing splitter 130 divides the path of incident light by transmitting or reflecting the incident light depending on polarization.

The reflective liquid crystal display device 110 includes a pair of substrates 111 and 119 between which a liquid crystal layer 115 is sandwiched. The substrate 119 is a silicon substrate and the substrate 111 on which light is incident is transparent. Signal electrodes 117a, 117b, and 117c are formed on the surface of the substrate 119 facing the liquid crystal layer 115 by mirror-coating. A transparent electrode 113 is formed on the surface of the transparent substrate 111 facing the liquid crystal layer 115. In the second embodiment of the present invention, like the signal electrodes 97a, 97b, and 97c in the first embodiment, three signal electrodes 117a, 117b, and 117c constitute a group for a unit micro lens 91a so that R, G, and B image signals can be alternately input.

When a silicon substrate is used as the substrate 119 on which the signal electrodes 117a, 117b, and 117c are formed, as is well known, a circuit device such as a CMOS device or a PMOS device allowing quick addressing can be formed by a "Chip on Silicon" method, so faster addressing than in a usual method can be accomplished.

Meanwhile, among the color light beams which are separated by the first micro lens array 91 and incident on the reflective liquid crystal display device 110, color light beams corresponding to the signal electrodes 117a and 117c are condensed on the signal electrodes 117a and 117c, respectively, at an incident angle of θ, so the color light beams are reflected at an angle of θ according to Snell's law. Accordingly, to prevent the image information of pixels from being mixed, a micro prism array 150 is provided, as shown in FIG. 10, or a second micro lens array 160 is provided, as shown in FIG. 11, between the reflective liquid crystal display device 110 and the first micro lens array 91. The micro prism array 150 or the second micro lens array 160 allows all incident color light beams to be perpendicularly incident on the mirror-surfaces of the signal electrodes 117a, 117b, and 117c so that a color light beam reflected from the liquid crystal display device 110 can pass through a micro lens 91a of the same first micro lens array 91 as when the color light beam has been incident on the reflective liquid crystal display device 110, thus preventing the image information of pixels from being mixed.

In a single-panel color image display apparatus 220 according to the second embodiment, when a color light beam emitted from the color light beam splitting unit 70 is reflected from the polarizing splitter 130 and incident on the image generator 90, the polarization of the light beam incident on the reflective liquid crystal display device 110 is rotated by 90 degrees when the light beam is reflected, thus passing through the polarizing splitter 130. Therefore, a color image realized by the reflective liquid crystal display device 110 is enlarged and projected on a screen by a projection lens unit 99.

It has been described that a color image display apparatus according to the present invention includes a liquid crystal display device, but the present invention is not restricted to the above description.

As described above, a single-panel color image display apparatus according to the present invention includes a plurality of switchable color filters selectively transmitting and/or reflecting a plurality of color light beams and has a structure in which the plurality of color light beams are radiated in turn at the same pixel of a display device so that true color can be realized in a unit pixel during a period of a single video frame. As a result, a single-panel color image display apparatus according to the present invention has physically the same resolution as a conventional projection-type single-panel image display apparatus using a color wheel and has substantially the same light efficiency and resolution as a conventional three-panel color image display apparatus using three display devices.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A single-panel color image display apparatus comprising:
    a light unit emitting white light;
    a color light beam splitting unit comprising a plurality of switchable color filters which selectively transmit and/or reflect a plurality of color light beams, the color light beam splitting unit splitting the white light incident from the light unit into a plurality of color light beams and reflecting the plurality of color light beams;
    an image generator generating a plurality of color images using the plurality of color light beams from the color light beam splitting unit; and
    a projection lens unit projecting the plurality of color images generated by the image generator onto a screen.

2. The single-panel color image display apparatus of claim 1, wherein the color light beam splitting unit comprises as many switchable color filters as color light beams generated by splitting.

3. The single-panel color image display apparatus of claim 2, wherein the switchable color filters alternately select and reflect the plurality of color light beams in response to electrical signals during each period of a subframe, which is one of as many subframes as color light beams generated by splitting.

4. The single-panel color image display apparatus of claim 1, wherein the switchable color filters alternately select and reflect the plurality of color light beams in response to electrical signals during each period of a subframe, which is one of as many subframes as color light beams generated by splitting.

5. The single-panel color image display apparatus of claim 1, wherein each of the switchable color filters comprises as many electronically switchable selective reflection/transmitting layers as color light beams generated by splitting.

6. The single-panel color image display apparatus of claim 2, wherein each of the switchable color filters comprises as many electronically switchable selective reflection/transmitting layers as color light beams generated by splitting.

7. The single-panel color image display apparatus of claim 3, wherein each of the switchable color filters comprises as many electronically switchable selective reflection/transmitting layers as color light beams generated by splitting.

8. The single-panel color image display apparatus of claim 4, wherein each of the switchable color filters comprises as many electronically switchable selective reflection/transmitting layers as color light beams generated by splitting.

9. The single-panel color image display apparatus of claim 5, wherein each of the selective reflection/transmitting layers comprises:
    a liquid crystal layer having at least one side facing a transparent substrate, the liquid crystal layer comprising liquid crystal drops in high-molecular chains arranged at predetermined intervals and a liquid crystal solution filling gaps among the liquid crystal drops, the liquid crystal layer selectively reflecting a predetermined color light beam according to the difference between the refractive index of the liquid crystal drops and the refractive index of the liquid crystal solution which is adjusted by an electrical signal; and
    a transparent electrode formed on the substrate to allow an electric field to be applied to the liquid crystal layer.

10. The single-panel color image display apparatus of claim 6, wherein each of the selective reflection/transmitting layers comprises:
    a liquid crystal layer having at least one side facing a transparent substrate, the liquid crystal layer comprising liquid crystal drops in high-molecular chains arranged at predetermined intervals and a liquid crystal solution filling gaps among the liquid crystal drops, the liquid crystal layer selectively reflecting a predetermined color light beam according to the difference between the refractive index of the liquid crystal drops and the refractive index of the liquid crystal solution which is adjusted by an electrical signal; and a transparent electrode formed on the substrate to allow an electric field to be applied to the liquid crystal layer.

11. The single-panel color image display apparatus of claim 7, wherein each of the selective reflection/transmitting layers comprises:

a liquid crystal layer having at least one side facing a transparent substrate, the liquid crystal layer comprising liquid crystal drops in high-molecular chains arranged at predetermined intervals and a liquid crystal solution filling gaps among the liquid crystal drops, the liquid crystal layer selectively reflecting a predetermined color light beam according to the difference between the refractive index of the liquid crystal drops and the refractive index of the liquid crystal solution which is adjusted by an electrical signal; and a transparent electrode formed on the substrate to allow an electric field to be applied to the liquid crystal layer.

12. The single-panel color image display apparatus of claim 6, wherein the plurality of switchable color filters are disposed at a predetermined angle to one another.

13. The single-panel color image display apparatus of claim 10, wherein the plurality of switchable color filters are disposed at a predetermined angle to one another.

14. The single-panel color image display apparatus of claim 11, wherein the plurality of switchable color filters are disposed at a predetermined angle to one another.

15. The single-panel color image display apparatus of claim 1, wherein the plurality of switchable color filters are disposed at a predetermined angle to one another.

16. The single-panel color image display apparatus of claim 1, wherein the light unit comprises:

a light source emitting white light;

a lighting lens converting light emitted from the light source into parallel light; and a polarization converter converting light emitted from the light source into a single linearly polarized light beam.

17. The single-panel color image display apparatus of claim 16, wherein the light lens comprises a fly eye lens array converting light incident from the light source into uniform beams.

18. The single-panel color image display apparatus of claim 16, wherein the polarization converter comprises:

a polarizing splitter selectively transmitting and reflecting incident light according to the linear polarization of the incident light;

a reflector reflecting light reflected from the polarizing splitter in a direction parallel to light transmitted by the polarizing splitter; and a half-wave plate disposed on the path of light transmitted by the polarizing splitter or light reflected from the reflector.

19. The single-panel color image display apparatus of claim 16, wherein the light source is a lamp-type light source having a parabolic reflector.

20. The single-panel color image display apparatus of claim 1, wherein the image generator comprises:

a first micro lens array condensing color light beams incident from the color light beam splitting unit; and a display device generating a color image from incident color light beams having passed through the first micro lens array.

21. The single-panel color image display apparatus of claim 20, wherein the display device is a transmissive liquid crystal display device.

22. The single-panel color image display apparatus of claim 20, wherein the display device is a reflective liquid crystal display device and further comprises a polarizing splitter between the color light beam splitting unit and the first micro lens array for transmitting or reflecting incident light according to polarization.

23. The single-panel color image display apparatus of claim 22, further comprising a micro prism array between the display device and the first micro lens array so that light reflected from the display device can pass through a micro lens of the same first micro lens array as when the reflected light was incident.

24. The single-panel color image display apparatus of claim 22, wherein the reflective liquid crystal display device comprises a pair of substrates between which a liquid crystal layer is sandwiched, and a substrate opposite to a transparent substrate on which light is incident is a silicon substrate.

25. The single-panel color image display apparatus of claim 22, further comprising a second micro lens array between the display device and the first micro lens array so that light reflected from the display device can pass through a micro lens of the same first micro lens array as when the reflected light was incident.

26. A method of a single-panel color image display apparatus, said method comprising:

emitting, by a light unit, white light;

splitting the white light incident from the light unit by a color light beam splitting unit into a plurality of color light beams and selectively reflecting the plurality of color light beams by a plurality of switchable color filters of the color light beam splitting unit;

generating by an image generator a plurality of color images using the plurality of color light beams from the color light beam splitting unit; and projecting onto a screen by a projection lens unit the plurality of color images generated by the image generator.

27. The method of claim 26, further comprising:

alternately selecting and reflecting the plurality of color light beams by the switchable color filters in response to electrical signals during each period of a subframe.

28. The method of claim 26, further comprising:

selectively reflecting by a liquid crystal layer of the switchable color filters a predetermined color light beam generated by the splitting according to the difference between the refractive index of liquid crystal drops included in the liquid crystal layer and the refractive index of a liquid crystal solution included in the liquid crystal layer, said difference being adjusted by an electrical signal.

29. The method of claim 28, further comprising:

applying an electric field to the liquid crystal layer.

30. The method of claim 28, further comprising:

arranging the liquid crystal drops in high-molecular chains at predetermined intervals; and filling gaps among the liquid crystal drops by the liquid crystal solution.

31. The method of claim 26, further comprising:

disposing the plurality of switchable color filters at a predetermined angle to one another.

32. A single-panel color image display apparatus comprising:

means for emitting a white light;

a color light beam splitting unit comprising a plurality of switchable color filters which selectively transmit and/ or reflect a plurality of color light beams, the color light beam splitting unit splitting the white light incident from the light unit into a plurality of color light beams and reflecting the plurality of color light beams; and means for generating a plurality of color images using the plurality of color light beams from the color light beam splitting unit and projecting the plurality of color images.

33. The single-panel color image display apparatus of claim 1, wherein the color light beam splitting unit comprises a number of switchable color filters corresponding to a number of color light beams generated by splitting.

34. The single-panel color image display apparatus of claim 1, wherein the switchable color filters alternately select and reflect the plurality of color light beams in response to electrical signals during each period of a subframe, and wherein the number of the subframes corresponds to the number of the color light beams generated by splitting.

35. The single-panel color image display apparatus of claim 1, wherein each of the switchable color filters comprises a number of electronically switchable selective reflection/transmitting layers corresponding to the number of color light beams generated by splitting.

36. The single-panel color image display apparatus of claim 33, wherein the plurality of switchable color filters are disposed at a predetermined angle to one another.

37. The single-panel color image display apparatus of claim 34, wherein the plurality of switchable color filters are disposed at a predetermined angle to one another.

38. The single-panel color image display apparatus of claim 35, wherein the plurality of switchable color filters are disposed at a predetermined angle to one another.

39. The method of claim 27, wherein a number of subframes corresponds to a number of color lights beams generated by the splitting.

40. The method of claim 39, further comprising:
dividing a video frame into 3 video subframes; and
forming color images in turn at the same pixel of a liquid crystal display device at intervals of $\frac{1}{3}$ of a video frame based upon color image signals corresponding to color light beams condensed on the signal electrodes.

* * * * *